US006784886B1

(12) United States Patent
Cailloux

(10) Patent No.: US 6,784,886 B1
(45) Date of Patent: Aug. 31, 2004

(54) METHOD FOR APPARATUS FOR ASSOCIATING OBJECTS WITH A SPLINE BY VALUE

(75) Inventor: Philippe Cailloux, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 581 days.

(21) Appl. No.: 09/649,262

(22) Filed: Aug. 28, 2000

(51) Int. Cl.[7] .............................................. G06T 11/20
(52) U.S. Cl. ....................... 345/440; 345/441; 345/442
(58) Field of Search ............................. 345/440, 440.1, 345/442, 443, 441, 619, 677, 672

(56) References Cited

U.S. PATENT DOCUMENTS

| | | | | |
|---|---|---|---|---|
| 5,307,451 A | * | 4/1994 | Clark .......................... | 345/427 |
| 5,539,868 A | * | 7/1996 | Hosoya et al. .............. | 345/471 |
| 5,831,632 A | * | 11/1998 | Schuster et al. ............ | 345/441 |
| 5,844,572 A | * | 12/1998 | Schott ......................... | 345/440 |
| 5,852,447 A | * | 12/1998 | Hosoya et al. .............. | 345/468 |
| 6,111,588 A | * | 8/2000 | Newell ........................ | 345/442 |
| 6,144,379 A | * | 11/2000 | Bertram et al. ......... | 345/440 X |
| 6,310,622 B1 | * | 10/2001 | Asente ........................ | 345/441 |
| 6,469,702 B1 | * | 10/2002 | Sheasby et al. ............. | 345/442 |
| 6,492,993 B1 | * | 12/2002 | Livesey et al. ............. | 345/588 |

OTHER PUBLICATIONS

Adobe, "Adobe Illustrator 8.0 Classroom in a Book", 1998, pp. 107.*

IntelliDraw—Aldus Reference Guide Version 2.0, (Your Complete Guide to IntelliDraw Tools, Commands, and Unique Features), pp 1–12 through 1–14, 2–31, 2–34 through 2–35, 2–54 through 2–62, 2–65 through 2–67, 3–14 through 3–16, 3–20 through 3–21, 3–38 through 3–39, 3–56 through 3–58, 4–3 through 4–6, 4–9 through 4–17 (Oct. 1991).

* cited by examiner

Primary Examiner—Michael Razavi
Assistant Examiner—Chante' Harrison
(74) Attorney, Agent, or Firm—Fish & Richardson P.C.

(57) ABSTRACT

A method is provided of associating objects on a non-linear contour according to one or more corresponding values. The method includes assigning a value to each object in a set of one or more objects, providing a starting point and an end point on a non-linear contour, graduating points on the non-linear contour covering a range of values inclusive of the values associated with each of the objects, and associating each object in the set of objects along the non-linear contour according to the value assigned to the object and the corresponding value associated with a point along the non-linear contour.

11 Claims, 3 Drawing Sheets

METHOD FOR APPARATUS FOR ASSOCIATING OBJECTS WITH A SPLINE BY VALUE

BACKGROUND OF THE INVENTION

This invention generally relates to the graphical representation of information.

A conventional two-dimensional graph plots (x,y) coordinate pairs of information along perpendicular X and Y coordinate axes. The X axis is generally a straight horizontal line having increasing values plotted from left and the Y axis is a straight vertical line having increasing values going from the bottom to the top of the axis. By plotting the (x,y) coordinate pairs, the underling information they represent can be visualized in two-dimensional space rather than simply raw values. To express a third dimension of information, an additional Z coordinate value is also included along with the (x,y) coordinate pair (e.g. an (x,y,z) coordinate system). The Z coordinate value is typically plotted along a Z axis running perpendicular to both the X and Y axes. The Z-axis is generally represented as a straight line perpendicular to a surface described by the X-axis and Y-axis.

The conventional graphical system typically plots either the two-dimensional or three-dimensional information on the X, Y, or X,Y, and Z axes to make the information more visually appealing. The axis against which each coordinate is plotted is kept straight and inflexible to ensure the resulting graph of information appears mathematically accurate. These conventional graphs may be used in time lines to plot events occurring over a course of time, temperature graphs to plot temperature variations over time, and in other instances where two or three dimensions of information must be displayed accurately.

Conventional graphing systems, however, cannot modify the shape of the axis while graphing points along the modified axis. For example, the straight axes used with conventional graphing systems are not designed to work with the curves and non-linear contours produced by graphic drawing packages. Further, conventional graphing systems do not facilitate repositioning of data points along an axis, which as been curved or changed into any shapes other than a straight line.

SUMMARY OF THE INVENTION

In one aspect of the invention, a method of associating objects according to one or more corresponding values includes assigning a value to each object in a set of one or more objects, providing a starting point and an end point on a non-linear contour, graduating points on the non-linear contour covering a range of values inclusive of the values associated with each of the objects, and associating each object in the set of objects along the non-linear contour according to the value assigned to the object and the corresponding value associated with a point along the non-linear contour.

Advantages provided by implementations of the invention include one or more of the following. Graphs are not limited to being placed on a linear axis. Instead, graphs can be placed on almost any non-linear contour that a graphical editor can produce. This allows a graphical editor to integrate graphs with a variety of shapes often used in the graphical editor. Further, the invention allows a non-linear contour to be reshaped and the positions of the data points recalculated and repositioned on the reshaped contour. For example, a user can adjust a non-linear curve using control handle and have objects attached to the non-linear contour automatically adjust to the new shape of the non-linear curve. Combinations of scales can be used on the non-linear curve depending on the values being used by the objects. These scales can include linear, logarithmic, logarithmic-logarithmic, and exponential. Again, implementations of the invention automatically adjust the position of the objects on the non-linear curve when the scales used on the non-linear curve change.

BRIEF DESCRIPTION OF THE DRAWINGS

The accompanying drawings, which are incorporated in and constitute a part of this specification, illustrate one implementation of the invention and, together with the description, serve to explain the advantages and principles of the invention.

DETAILED DESCRIPTION

Figure 1:
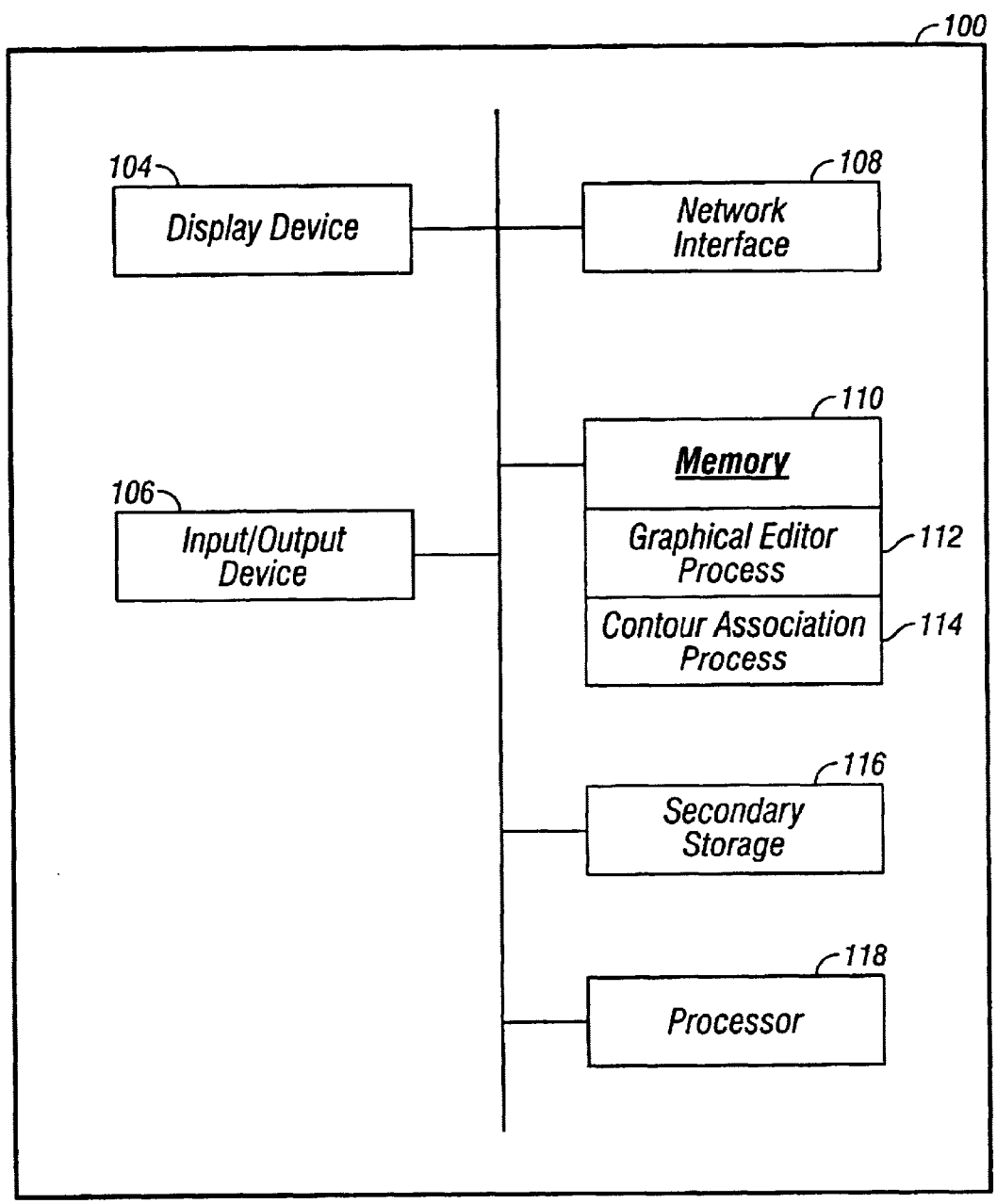
FIG. 1 is a block diagram representation of a computer system for graphically displaying information consistent with one implementation of the present invention.

FIG. 1 is a block diagram of a computer system for graphically displaying information. This computer system 102 includes a display device 104, an input/output device 106, a network interface 108, a memory 110, a secondary storage 116, and a processor 118. During execution memory 110 includes instructions for a graphical editor process 112 and a contour association process 114. Graphical editor process 112 may also use a variety of other conventional graphical editor processes performing operations such as vector drawing and editing, bitmap drawing and editing, video editing, and visual effects including distortions and visual renderings. Graphical editor process 112 delegates managing objects and non-linear contours to contour association process 114. These objects can be a 2D, 3D, or multimedia or other kinds of graphical object that a user sees and selects on a display device. For example, each object can be a traditional geometric shape or can be a predetermined video or an image clip that automatically plays once it is selected.

Figure 2:
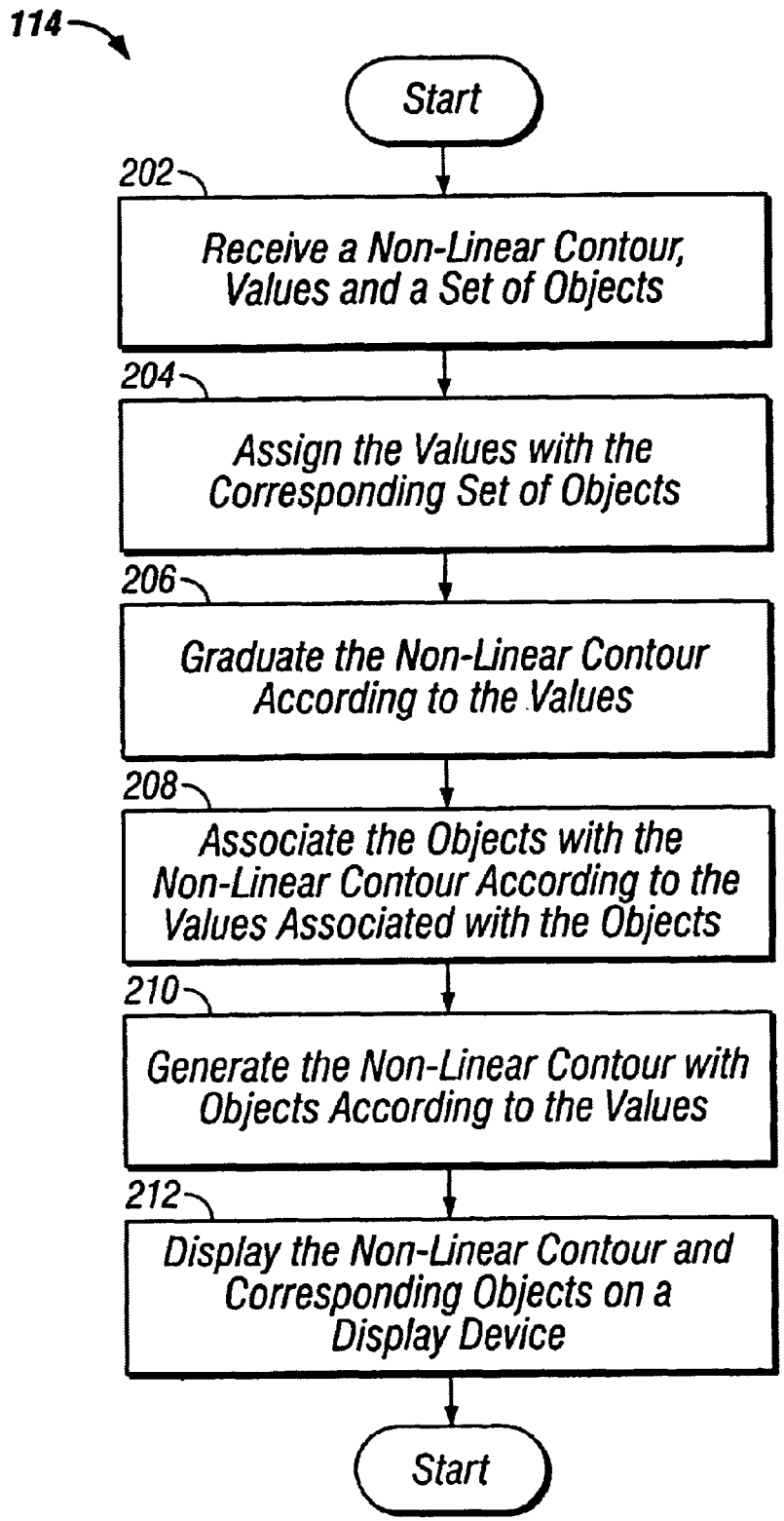
FIG. 2 is a flow chart corresponding to the operations used to generate a non-linear contour and objects having values that correspond to the non-linear contour.

FIG. 2 is a flow chart diagram showing the operations associated with contour association process 114. Contour association process 114 receives a non-linear contour from graphical editor process 112 (step 202). For example, one non-linear contour can be a Bezier curve. In graphical editor process 112, the shape of the Bezier curve is determined mathematically by the location of two endpoints and two midpoints called control handles. Usually the handles appear on the screen as two small boxes. By clicking on the handles and dragging them with the mouse, a user can change the shape of the curve.

Contour association process 114 also receives from graphical editor process 112 a set of objects and a range of values. The objects are graphical elements that contour association process 114 associates with the non-linear contour according to the set of values. In one implementation, the values associated with the objects include characteristics associated with the object such as a temperature, a weight, a mass, a specific period in time, and a color. The objects can be any shape or size element capable of being displayed on display device 104. The types of objects displayed on display device 104 may include geometric shapes, photographic images, and animated images. In addition, these objects can also include multimedia objects combining the geometric shapes or images with sounds or music.

Each value is associated with both an object and a position on the non-linear contour (step 204). The values represent different types of information such as time, distance, temperature, or other measurements.

An object connector connects the object and the non-linear contour and is displayed on display device 104. Contour association process 114 uses the object connector to show a visual connection between an object and the non-linear contour. The object connector can be a line or a more complex geometric shape placed between the object and the non-linear contour. For example, a pyramid shape can be used as an object connector between an object and a non-linear contour.

To connect the objects with the non-linear contour, contour association process 114 graduates the non-linear contour into intervals subdividing the range of values (step 206). Each interval is defined along the non-linear contour using a pair of tick marks. The granularity of these intervals and number of tick marks depends on the values associated with the various objects. For example, the start and end point values associated with the non-linear contour may correspond to the lowest and highest values associated with each object in the set of objects. This ensures that the values associated with each object are contained within the non-linear contour and can be displayed on display device 104.

The number of intervals between the start and end point depends on the number of objects and the values associated with each of the objects. If a large number of objects are to be associated with a non-linear contour, contour association process 114 may automatically use smaller intervals. Conversely, if a fewer number of objects are to be associated with the non-linear contour, contour association process 114 may use larger intervals.

In one implementation, the intervals are equally spaced along the non-linear contour. This implementation performs the method of graduating the non-linear contour with evenly spaced intervals wherein the values and corresponding objects are spread evenly over the non-linear contour. Alternatively, contour association process 114 can make uneven intervals along the non-linear contour. For example, a longer distance value may be used to span a relatively short distance an area along the non-linear contour where there are no objects to display. Conversely, smaller intervals can be created when there are more objects along the non-linear contour. By varying the size of an interval, the non-linear contour can display objects having values spread unevenly through the range of values. Because the tick marks can be moved, a user may decide to adjust the position of tick marks by selecting a tick mark and sliding it along the non-linear contour. This can be used to establish a different scale along a portion of the non-linear contour. For example, intervals along a portion of the non-linear contour may correspond to linear values while another interval along the non-linear contour corresponds to exponential, logarithmic or logarithmic-logarithmic scaling. In addition, tick marks and intervals can be used to established ad-hoc scaling along the non-linear contour as needed by the user customizing the non-linear contour.

Contour association process 114 then associates each of the objects and corresponding values with the proper position along the non-linear contour (step 208). This typically occurs within the graphical user interface on the display device The association between the objects and the non-linear contour occurs automatically unless a user indicates otherwise to contour association process 114. For example, a non-linear contour may cover temperature values ranging from 0 Celsius to 100 Celsius. If contour association process 114 receives an object having a temperature value of 50 Celsius, contour association process 114 automatically attaches the object at the proper position on the non-linear contour. Alternatively, a user can manually associate an object having a value with a non-linear contour by dragging and dropping the object onto the non-linear contour. This allows the user greater control over associating objects with the non-linear contour. For example, this feature can be useful in diagrams with multiple non-linear contours where the objects can be associated with more than one non-linear contour. Instead of automatically associating an object with the non-linear contour, the user selects which contour to use by manually dragging and dropping the object onto one of the multiple non-linear contour.

Contour association process 114 generates the non-linear contour according to the objects and corresponding values (step 210). Essentially, contour association process 114 measures the distance along the non-linear contour according to a mathematical formula describing the contour and then places the objects at the proper intervals along the contour according to values. If the user selects a different type of non-linear contour, contour association process 114 automatically associates the objects along the non-linear contour using a different mathematical formula.

Contour association process 114 also automatically positions the objects on the contour when the user changes the shape of the contour. This includes changing the shape of the objects and modifying the object connectors that connect the objects to the contour. Contour association process 114 also combines multimedia information with the objects to facilitate play-back of predetermined sounds or images when one of the objects on the non-linear contour are displayed on display device 104 and selected by a user.

In addition, contour associating process 114 also changes the association of objects to the non-linear contour when the scales associated with the contour are changed. For example, the change of scale from linear to logarithmic on a contour causes the objects to automatically change their position along the non-linear contour.

Once the non-linear contour and objects are generated, contour association process 114 provides the non-linear contour and corresponding objects to graphical editor process 112 for display on display device 104 (step 212).

Figure 3:
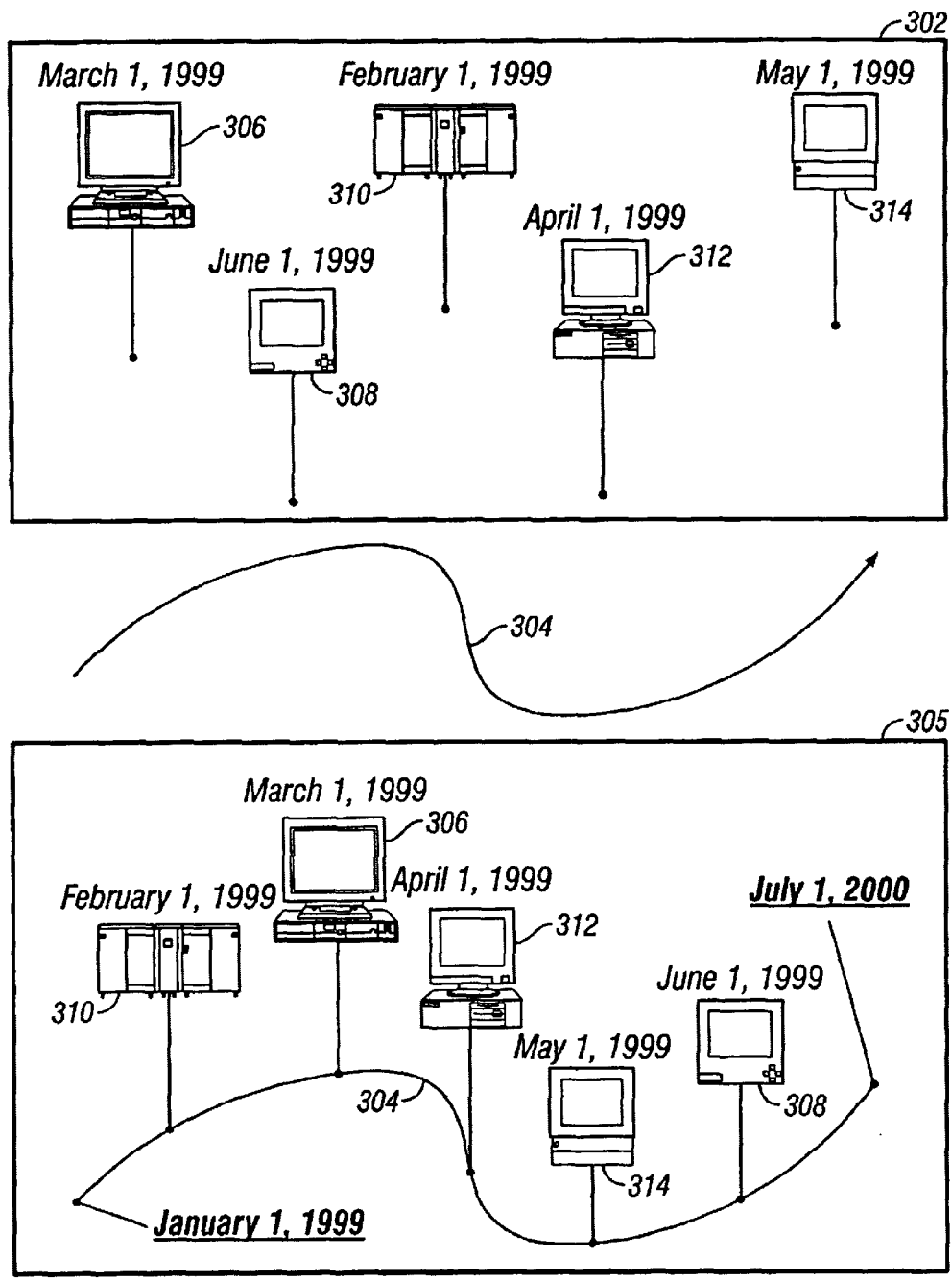
FIG. 3 is a block diagram representation of objects having values, a non-linear contour having values, and an association of non-linear contour with the objects consistent with the present invention.

FIG. 3 is a block diagram illustrating a set of objects 302 having values, a non-linear contour 304, and a non-linear contour with the objects 305. Objects 302 include the individual graphic illustrations of computer systems 306, 308, 310, 312,and 314. Each of the respective computer system illustrations include a corresponding date value of "Mar. 1, 1999", "Jun. 1, 1999", "Feb. 1, 1999", "Apr. 1, 1999", and "May 1, 1999". Initially, non-linear contour 304 includes endpoints but no values. In operation, contour association process 114 automatically sets the endpoint values for the non-linear contour inclusive of the range of values associated with objects 302 and then associates each object with non-linear contour 304 in order resulting in non-linear contour with objects 305. In this example, the values associated with the objects are dates approximately 1 month apart so they are placed at approximately equal distances along the non-linear contour. However, if the objects are associated with different time intervals they can appear at different intervals along the non-linear contour. Although these objects are drawn to scale on the non-linear contour, other objects can be drawn on the non-linear contour on a different scale. In some cases, the scale can vary to accommodate a large number objects on a non-linear contour having a shorter length.

Additionally, a user can operate control handles associated with the non-linear contour to change the shape of the contour and also cause contour association process 114 to move the objects to the appropriate place along the non-linear contour.

Aspects of the invention can be implemented in digital electronic circuitry, or in computer hardware, firmware, software, or various combinations thereof. An apparatus can be implemented as a computer program product tangibly embodied in a machine-readable storage device for execution by a programmable processor; and method steps of the invention can be performed by a programmable processor executing a program of instructions to perform functions of the invention by operating on input data and generating output. The invention can also be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

While specific embodiments have been described herein for purposes of illustration, various modifications may be made without departing from the spirit and scope of the invention. Accordingly, the invention is not limited to the above-described implementations, but instead is defined by the appended claims in light of their full scope of equivalents.

What is claimed is:

1. A computer-implemented method comprising:
    assigning a value to each object in a set of objects wherein the value is associated with some aspect of the object;
    receiving a non-linear contour having a starting point and an end point corresponding to the respective lowest and highest values associated with each object in the set of objects and having a shape, the shape independent of the values assigned to the objects;
    defining a predetermined scale on the contour for a range of values, the range of values including the values associated with each of the objects wherein one or more intervals along the non-linear contour are determined according to the predetermined scale;
    associating each object in the set of objects with a point on the non-linear contour automatically according to the value assigned to the object and the corresponding value associated with a point along the non-linear contour; and
    adjusting the shape of the non-linear contour with control handles causing the objects to automatically move to an appropriate location along the non-linear contour,
    wherein the value associated with each object corresponds to a characteristic selected from a group including a temperature, a weight, a mass, a specific period in the, and a color.

2. A computer-implemented method comprising:
    assigning a value to each object in a set of objects wherein the value is associated with some aspect of the object;
    receiving a non-linear contour having a starting point and an end point corresponding to the respective lowest and highest values associated with each object in the set of objects and having a shape, the shape independent of the values assigned to the objects;
    defining a predetermined scale on the contour for a range of values, the range of values including the values associated with each of the objects wherein one or more intervals along the non-linear contour are determined according to the predetermined scale;
    associating each object in the set of objects with a point on the non-linear contour automatically according to the value assigned to the object and the corresponding value associated with a point along the non-linear contour; and
    adjusting the shape of the non-linear contour with control handles causing the objects to automatically move to an appropriate location along the non-linear contour,
    wherein the objects include at least one selected from the group including geometric shapes, photographic images, animated images, and multimedia objects combining geometric shapes, photographic images or animated images with sound.

3. A computer-implemented method comprising:
    assigning value to each object in a set of objects wherein the value is associated with some aspect of the object;
    receiving a non-linear contour having a starting point and an end point corresponding to the respective lowest and highest values associated with each object in the set of objects and having a shape, the shape independent of the values assigned to the objects;
    defining a predetermined scale on the contour for a range of values, the range of values including the values associated with each of the objects wherein one or more intervals along the non-linear contour are determined according to the predetermined scale;
    associating each object in the set of objects with a point on the non-linear contour automatically according to the value assigned to the object and the corresponding value associated with a point along the non-linear contour; and
    adjusting the shape of the non-linear contour with control handles causing the objects to automatically move to an appropriate location along the non-linear contour,
    wherein the predetermined scale includes at least one scale selected from a set of scales including linear, logarithmic, and exponential.

4. A computer program product, tangibly stored on a computer-readable medium, comprising instructions causing a computer capable of executing the instructions to associate objects according to their corresponding values by:
    assigning a value to each object in a set of objects;
    receiving a non-linear contour having a starting point and an end point and having a shape, the shape independent of the values assigned to the objects;
    defining a scale on the contour for a range of values inclusive of the values associated with each of the objects; and
    associating each object in the set of objects to a point on the non-linear contour according to the value assigned to the object and the corresponding value associated with a point alone the non-linear contour,
    wherein the value associated with each object corresponds to a characteristic selected from a group including a temperature, a weight, a mass, a specific period in time and a color.

5. A computer program product, tangibly stored on a computer-readable medium comprising instructions causing a computer capable of executing the instructions to associate objects according to their corresponding values by:

assigning a value to each object in a set of objects;

receiving a non-linear contour having a starting point and an end point and having a shape, the shape independent of the values assigned to the objects;

defining a scale on the contour for a range of values inclusive of the values associated with each of the objects; and associating each object in the set of objects to a point on the non-linear contour according to the value assigned to the object and the corresponding value associated with a point along the non-linear contour, wherein the objects include at least one selected from a group including geometric shapes, photographic images, animated images and multimedia objects combining geometric shapes, photographic images or animated images with sound.

6. A computer program product, tangibly stored on a computer-readable medium, comprising instructions causing a commuter capable of executing the instructions to associate objects according to their corresponding values by:

assigning a value to each object in a set of objects;

receiving a non-linear contour having a starting point and an end point and having a shape, the shape independent of the values assigned to the objects;

defining a scale on the contour for a range of values inclusive of the values associated with each of the objects; and associating each object in the set of objects to a point on the non-linear contour according to the value assigned to the object and the corresponding value associated with a point along the non-linear contour, wherein the predetermined scale includes at least one scale selected from a set of scales including linear, logarithmic and exponential.

7. A computer program product, tangibly stored on a computer-readable medium, comprising instructions causing a computer capable of executing the instructions to associate objects according to their corresponding values by:

assigning a value to each object in a set of objects;

receiving a non-linear contour having a starting point and an end point and having a shape, the shape independent of the values assigned to the objects;

defining a scale on the contour for a range of values inclusive of the values associated with each of the objects;

associating each object in the set of objects to a point on the non-linear contour according to the value assigned to the object and the corresponding value associated with a point along the non-linear contour including connecting each object with a point on the non-linear contour with an object connector;

displaying the non-linear contour and objects associated by value with the non-linear contour on a display device; and displaying an object connector connecting each object in the set of objects with a point on the non-linear contour.

8. The computer-program product of claim 7, wherein an object connector includes at least one selected from a group including a line and a geometric shape, the line or geometric shape extending from the object to the point on the non-linear contour.

9. A computer-implemented method comprising:

assigning a value to each object in a set of one or more objects; receiving a non-linear contour having a starting point and an end point and having a shape, the shave independent of the values assigned to the objects;

defining a scale on the contour for a range of values, the range including the values associated with each of the objects;

associating each object in the set of objects with a point on the non-linear contour according to the value assigned to the object and the corresponding value associated with a point along the non-linear contour including connecting each object with a point on the non-linear contour with an object connector;

displaying the non-linear contour and objects associated by value with the non-linear contour on a display device; and displaying an object connector connecting each object in the set of objects with a point on the non-linear contour.

10. The method of claim 9, wherein an object connector includes at least one object selected from a group of objects including a line and a geometric shape, the line or geometric shape extending from the object to the point on the non-linear contour.

11. A computer-implemented method comprising:

assigning a value to each object in a set of objects wherein the value is associated with some aspect of the object;

receiving a non-linear contour having a starting point and an end point corresponding to the respective lowest and highest values associated with each object in the set of objects and having a shape, the shape independent of the values assigned to the objects;

defining a predetermined scale on the contour for a range of values, the range of values including the values associated with each of the objects wherein one or more intervals along the non-linear contour are determined according to the predetermined scale;

associating each object in the set of objects with a point on the non-linear contour automatically according to the value assigned to the object and the corresponding value associated with a point along the non-linear contour, including connecting each object with a point on the non-linear contour with an object connector;

adjusting the shape of the non-linear contour with control handles causing the objects to automatically move to an appropriate location along the non-linear contour;

displaying the non-linear contour and objects associated by value with the non-linear contour on a display device; and displaying an object connector connecting each object in the set of objects with a point on the non-linear contour.

* * * * *

UNITED STATES PATENT AND TRADEMARK OFFICE
CERTIFICATE OF CORRECTION

PATENT NO. : 6,784,886 B1
DATED : August 31, 2004
INVENTOR(S) : Philippe Cailloux It is certified that error appears in the above-identified patent and that said Letters Patent is hereby corrected as shown below:

Title page,
Item [54], Title, delete the first occurrence of "FOR" and replace with -- AND --;

Column 5,
Line 65, delete "including" and replace with -- consisting of --;
Line 66, delete "the" and replace with -- time --;

Column 6,
Lines 22, 48 and 66, delete "including" and replace with -- consisting of --;
Line 27, after "assigning", insert -- a --;
Line 64, delete "alone" and replace with -- along --;

Column 7,
Line 2, after "medium", insert -- , --;
Lines 17 and 37, delete "including" and replace with -- consisting of --.

Signed and Sealed this

Eighth Day of February, 2005

JON W. DUDAS
*Director of the United States Patent and Trademark Office*